Jan. 6, 1942.    J. E. OTT    2,269,285
STRAP JOINT
Filed April 5, 1939    3 Sheets-Sheet 1
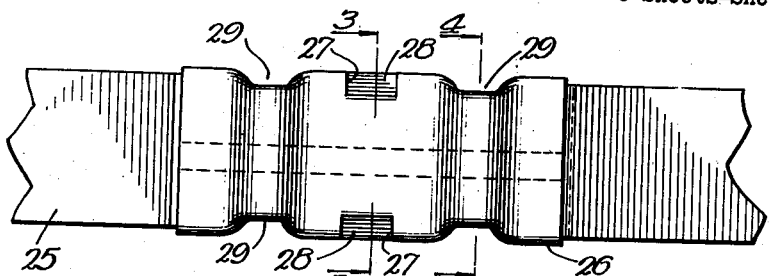
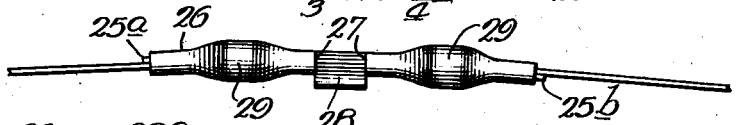
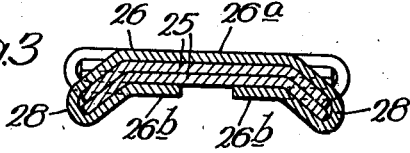
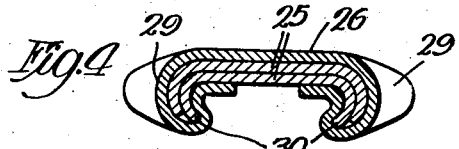
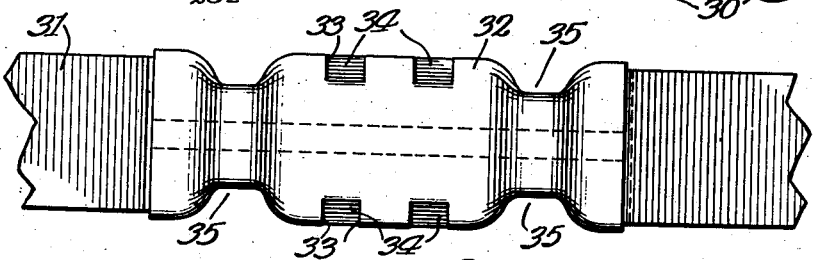
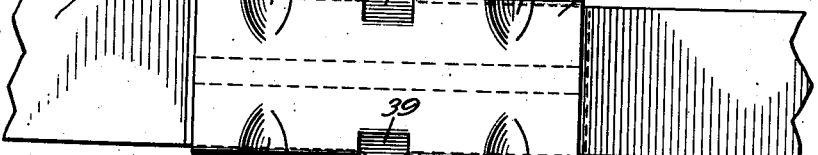
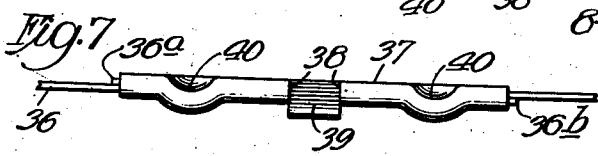
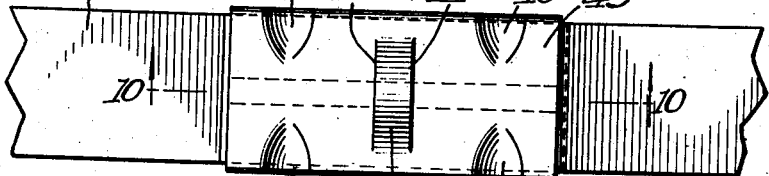
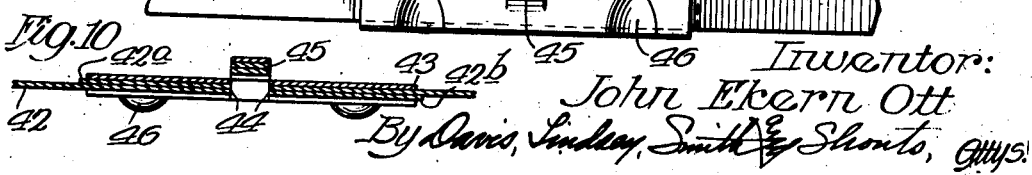
Inventor:
John Ekern Ott
By Davis, Lindsey, Smith & Shonts, Attys.

Jan. 6, 1942.   J. E. OTT   2,269,285
STRAP JOINT
Filed April 5, 1939   3 Sheets-Sheet 2
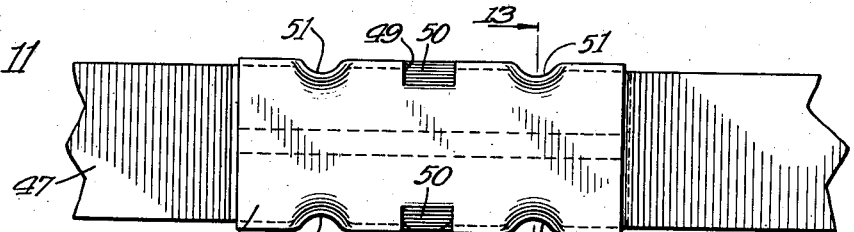
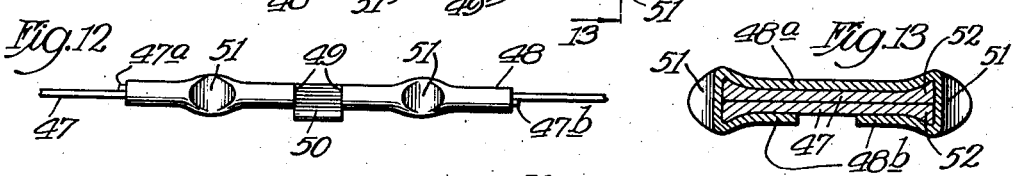
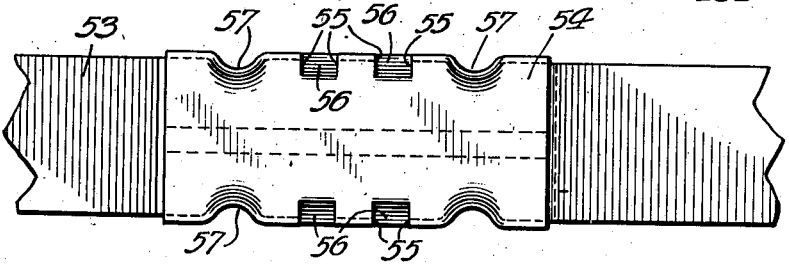
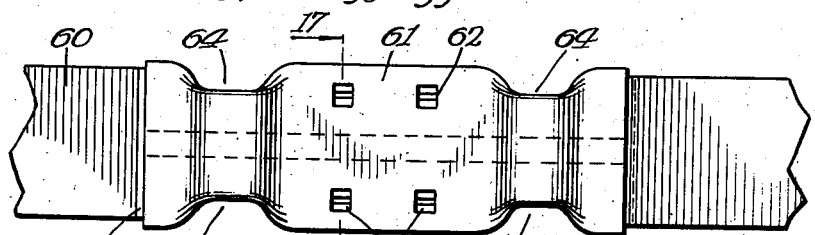
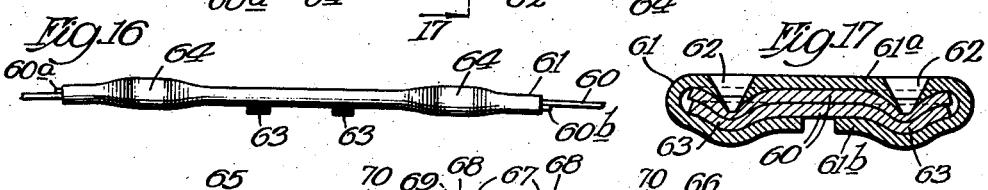
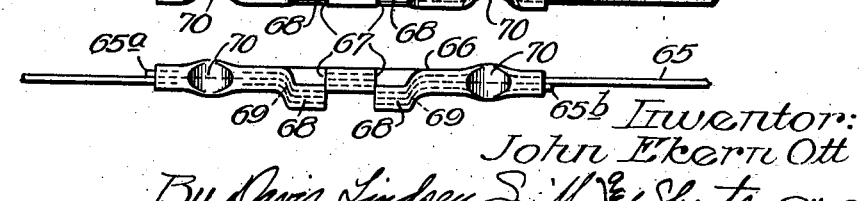
Inventor:
John Ekern Ott
By Davis, Lindsey, Smith & Shonts, Attys

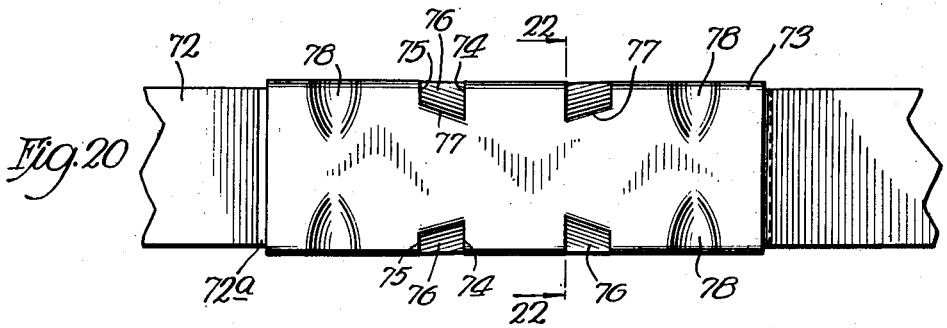
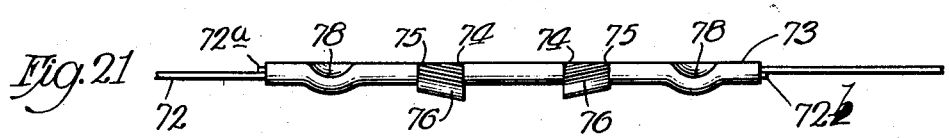
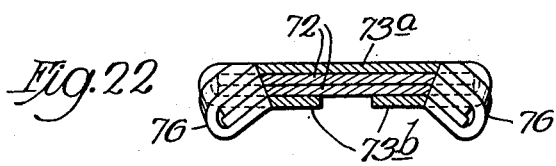
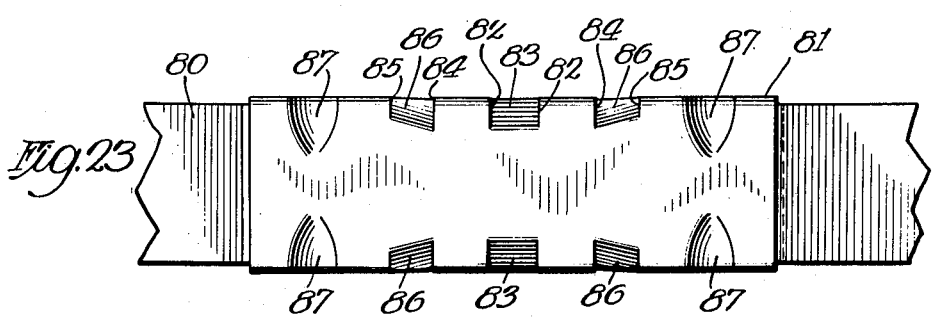
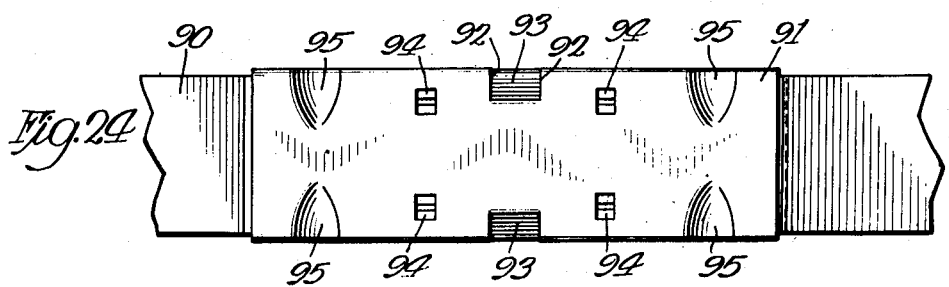

Patented Jan. 6, 1942

2,269,285

UNITED STATES PATENT OFFICE 2,269,285

STRAP JOINT

John Ekern Ott, Lisle Township, Du Page County, Ill., assignor to Acme-Steel Company, Chicago, Ill., a corporation of Illinois Application April 5, 1939, Serial No. 266,081

3 Claims. (Cl. 24—23)

This invention relates to improvements in strap joints and methods of forming the same and the purpose of the invention is to provide an improved sealing joint for uniting the overlapping ends of a metallic strap such as is commonly used for reinforcing boxes and packages or for binding together a plurality of boxes or packages to form a load unit. The present invention is an improvement upon the seal joint disclosed in the United States patent to Ralph H. Norton, No. 1,260,016, dated March 19, 1918.

In said prior Norton patent there is disclosed a strap seal of sleeve-like form which encloses the overlapping ends of a metal strap, the edges of the strap and seal being sheared transversely to form lugs which are bent transversely to the plane of the strap to cause portions of the strap and seal at the edges of the cuts to abut against each other and thereby prevent relative endwise movement of the strap ends. A seal of that type is strong and secure but it has been found in practice that the strength of the joint is substantially less than the strength of the strap which has its ends united by the joint. The strength of the joint may be increased within certain limits by decreasing the depth of the cuts, but there is a marked decrease in the joint strength as the depth of the cuts approaches zero. The joint strength may also be increased by increasing the thickness of the material forming the seal but to effect an increase to anything approaching the strength of the strap, it is necessary to increase the seal thickness to an unreasonable point with respect to size and cost.

Also, in the case of joints of the type disclosed in the United States patent to William C. Fork, No. 1,232,674, dated July 10, 1917, for example, wherein a sleeve-like seal and enclosed overlapping strap ends are crimped at their marginal portions only to provide an interlocking connection without shearing the strap or the seal, it has been found that in practice the joint strength is considerably below the strength of the strap.

The deficiencies of strap joints of the types referred to are overcome by the present invention which involves the discovery that the strength of a strap joint employing a seal enclosing overlapping strap ends may be increased to the range of from ninety-five per cent to one hundred per cent of the strength of the strap by employing the shearing cuts and deflected lugs of the Norton type of joint in combination with crimps or the like, such as those disclosed in the said Fork patent. For illustration, the improved joint, embodying a metal seal enclosing overlapping strap ends, may have shearing cuts and deflected lugs at opposite edges of the middle portion of the seal, as in the Norton patent, and crimped deformations of the Fork type at opposite edges of the end portions of the seal, the crimped deformations being of the same depth or physical magnitude as the shearing cuts, or of greater physical depth or magnitude. With this combination, a portion of the stress which has to be transmitted through the joint is absorbed by the interlocking shoulders of the crimped deformations in the end portions of the joint, so that the remaining portion of the stress which has to be transmitted through the uncut portion of the strap in the middle portion of the seal will be less than the tensile strength of the uncut portion of the strap at that point. The advantages of the present invention may be obtained by combining the interlocking shoulders of various types of joints which are formed by cutting or shearing the seal and the enclosed strap ends with various types of joints in which the interlocking connection between the seal and the strap ends is formed by crimping or otherwise deforming portions of the seal and the enclosed strap ends without shearing or cutting them, the depth or physical magnitude of the crimps or other such deformations being such as to reduce the stress which must be transmitted through the portion of the joint where the seal and the strap ends are cut to a point below the tensile strength of the uncut portion of the strap and, in general, this may be effected by so forming the crimps or other deformations that their depth or physical magnitude is equal to or greater than the depth or physical magnitude of the shearing cuts which are provided in another part of the joint. These and other characteristics and advantages of the present invention will appear more fully hereinafter.

The nature of the invention will be understood from the following specification taken with the accompanying drawings in which several embodiments of the invention are illustrated. In the drawings, Figure 1 shows a top plan view of a strap joint embodying the present invention, wherein shearing cuts and deflected lugs of the type disclosed in said Norton patent are combined with crimps or deformations of the type disclosed in the United States patent to Flora, No. 1,252,680, dated January 8, 1918;

Fig. 2 shows a side elevation of the joint illustrated in Fig. 1;

Fig. 3 shows an enlarged transverse section taken on the line 3—3 of Fig. 1;

Fig. 4 shows an enlarged transverse section taken on the line 4—4 of Fig. 1;

Fig. 5 shows a plan view of a strap joint embodying a modified form of the invention similar to that illustrated in Fig. 1, but differing therefrom in that two pairs of shearing cuts and two deflected lugs of the Norton type are provided at each side of the central portion of the joint and also in that the crimps in the end portions of the joint are of greater depth or physical magnitude than the transverse cuts in the central portion;

Fig. 6 shows a top plan view of another form of the invention, in which shearing cuts and deflected lugs of the Norton type, located in the central portion of the joint, are combined with crimps of the type disclosed in the said United States patent to Fork;

Fig. 7 shows a side elevation of the joint illustrated in Fig. 6;

Fig. 8 shows an enlarged transverse section taken on the line 8—8 of Fig. 6;

Fig. 9 shows a top plan view of a modified form of the invention, which is similar to that shown in Fig. 6, except that the interlocking connection in the middle portion of the joint is formed by a pair of cuts and a transversely bent intermediate hump as in the United States patent to Samuel J. Parsons No. 1,553,791, dated September 15, 1925;

Fig. 10 shows a longitudinal section taken on the line 10—10 of Fig. 9;

Fig. 11 shows a top plan view of another form of joint embodying the present invention, wherein shearing cuts and deflected lugs of the Norton type are combined with crimps of the form disclosed in the United States patent to Otis L. Davis, No. 1,786,151, dated December 23, 1930;

Fig. 12 shows a side elevation of the strap joint illustrated in Fig. 11;

Fig. 13 shows an enlarged transverse sectional view taken on the lines 13—13 of Fig. 11;

Fig. 14 shows a top plan view of another form of the invention which is similar to that illustrated in Fig. 11, except that two pairs of shearing cuts and two deflected lugs of the Norton type are provided at opposite edges of the middle portion of the joint;

Fig. 15 is a top plan view of still another form of the invention, in which interlocking shoulders formed by shearing the seal and the enclosed strap ends and deflecting the adjacent metal, as in the United States patent to Frank P. Prindle, No. 2,053,739, dated September 8, 1936, are combined with crimps of the type disclosed in said Flora patent;

Fig. 16 shows a side elevation of the joint illustrated in Fig. 15;

Fig. 17 shows an enlarged transverse section taken on the line 17—17 of Fig. 14;

Fig. 18 shows a top plan view of another form of the invention in which shearing cuts and deflected portions of the type disclosed in the United States patent to Frank P. Prindle, No. 1,981,371, dated November 20, 1934, are combined with crimps or deformations of the form disclosed in said patent to Davis;

Fig. 19 shows a side elevation of the joint illustrated in Fig. 18;

Fig. 20 shows a top plan view of a strap joint embodying another form of the invention, in which shearing cuts and deflected lugs of the type in my United States Patent No. 1,891,239, dated December 20, 1932, are combined with crimps or deformations of the type disclosed in said Fork patent;

Fig. 21 shows a side elevation of the joint illustrated in Fig. 20;

Fig. 22 shows an enlarged transverse section taken on the line 22—22 of Fig. 20;

Fig. 23 shows a top plan view of a strap joint embodying another form of the invention, in which shearing cuts and deflected lugs of the Norton type, located in the middle portion of the joint, are combined with shearing cuts and deflected lugs of the type disclosed in said Ott Patent No. 1,891,239, and also with crimps of the type disclosed in said Fork patent; and Fig. 24 shows a top plan view of another strap joint embodying still another form of the invention, in which shearing cuts and deflected lugs of the Norton type are combined with shearing cuts and deflected portions of the type disclosed in said Prindle Patent No. 2,053,739 and also with crimps of the type disclosed in said Fork patent.

In the form of the invention shown in Figs. 1, 2, 3 and 4, the strap 25, which may be a flat flexible steel strap such as is ordinarily used for reinforcing boxes and packages, has overlapping end portions 25a and 25b which are enclosed within a sleeve-like metal seal 26 formed of material having sufficient ductility to permit it to be deformed under the pressure of a sealing tool or the like but also having sufficient stiffness to cause it to retain its deformations after it has been operated upon. This seal has a top wall 26a which overlies the upper strap end and it extends around the edges of the strap in close proximity thereto with its lower flanges 26b lying in close contact with the under surface of the lower end of the strap. The seal may be initially in the form of a sleeve through which the strap ends are threaded, or it may be either a flat plate or a channel-shaped seal, the lateral edge portions of which are bent around the overlapping strap ends after the middle portion 26a of the seal has been seated thereon.

The seal 26 and the enclosed strap ends 25a and 25b are sheared transversely adjacent the middle portion of the seal to form transverse cuts 27 which are arranged in pairs on opposite sides of the joint. The cuts 27 of each pair are spaced apart and the metal of the seal and the enclosed strap ends between the cuts is bent or deflected downwardly to form lugs 28, the edges of which interlock with the edges of the body portions of the strap and seal along the cuts 27 to provide abutting shoulders which prevent relative endwise movement of the strap ends and also movement of these ends with respect to the seal. This is the type of joint which is disclosed in the above mentioned Norton patent and it is preferably formed by the use of a sealing tool which shears the metal to form the cuts 27 and also bends the intervening metal down to form the lugs 28.

In conjunction with the interlocking connection formed by the cuts 27 and the deflected lugs 28, the joint comprises a plurality of other deformations of a different character which, in this instance, are of the form disclosed in the said Flora patent. In forming these other deformations, the end portions of the seal and enclosed strap ends are crimped by applying pressure to the edge portions of the strap and the seal in the plane of the strap to form the crimps or indentations 29 which are located opposite each other in pairs and which involve the curling of edge portions of the strap ends and the seal downwardly and inwardly, as shown at 30, thus providing interlocking shoulders which resist the longitudinal strain put upon the strap when it is in use. The crimps or deformations 29 are, in this instance, of substantially the same depth or physical magnitude as the depth of the cuts 27 and it is found that with this arrangement a composite joint strength is obtained which is very much higher than the strength of the joint which would be produced using either form of deformation alone and that it may be more than ninety-five per cent of the strength of the uncut strap.

The forms of deformations of different character which are shown in Figs. 1 to 4, inclusive, may be used in various combinations and any number of pairs of deformations of each kind may be used in a single joint. The deformations toward the ends of the joint which are produced by crimping the metal without cutting it may be of greater depth or physical magnitude than the deformations which are produced by cutting the metal and then bending it. These modifications are illustrated in Fig. 5 where the joint is shown in connection with a strap 31 having overlapping ends which are enclosed within a sleeve-like metal seal 32 similar to that previously described. This seal and the enclosed strap ends are sheared transversely, as shown at 33, along their opposite edges to provide cuts which extend transversely to the longitudinal axis of the strap. These cuts are spaced apart in pairs and the pairs of cuts are located opposite each other on opposite sides of the joint. In this instance, there are two pairs of cuts at each side of the joint and the metal between each pair is deflected downwardly to form a lug 34, thus providing interlocking shoulders which prevent relative movement of the seal and the enclosed strap ends, as in the form of construction previously described. These deformations of the Norton type are combined with other deformations or crimps 35 of the Flora type which are located opposite each other in pairs between the lugs 34 and the ends of the seal. The deformations 35 are similar to those previously described but, in this instance, they have a greater depth or physical magnitude than the depth of the cuts 33 and the associated lugs 34, thus causing a greater proportion of the strain put upon the strap to be taken up by the deformations 35 and reducing the strain put upon the uncut portion of the strap between the oppositely disposed cuts 33.

In Figs. 6, 7 and 8, there is disclosed another form of the invention in which deformations of the Norton type are combined with deformations of the form shown in the above mentioned patent to Fork. In this embodiment, a strap 36 has overlapping ends 36a and 36b which are enclosed within a metal seal 37 of sleeve-like form having a top wall 37a overlying the strap ends and flanges 37b which underlie the lower strap end 36b. The lateral edges of the seal and the enclosed strap ends are sheared transversely to form parallel cuts 38 and intervening lugs 39, the lugs being bent downwardly out of the plane of the seal and the enclosed strap ends to provide interlocking shoulders at the edges of the lugs to prevent relative endwise movement of the connected parts. Adjacent the end portions of the seal 37 there are provided two pairs of oppositely disposed deformations 40 which are formed by pressing the metal of the seal and the strap ends downwardly within cone-shaped areas extending inwardly from the edges of the seal. These marginal deformations are bowed downwardly at the edges of the seal, as shown in Fig. 7, and they provide interlocking parts which reduce the strain put upon the uncut portion of the strap in the middle of the joint between the opposed cuts 38. The deformations 40 should be of the same depth or magnitude as the cuts 38 or of greater depth or magnitude in order to produce the best results.

In Figs. 9 and 10, there is disclosed another embodiment of the invention in which interlocking deformations of the type disclosed in the above mentioned patent to Parsons are combined with deformations of the form disclosed in the patent to Fork. In this form of the invention, the metal strap 42 has overlapping ends 42a and 42b which are enclosed within a sleeve-like metal seal 43 having the form previously described when first applied to the strap ends and before being deformed. The seal and the enclosed strap ends are sheared transversely along parallel lines 44 which terminate short of the edges of the strap and seal, thus forming an intervening laminated bar of metal which is bent upwardly to provide a deformation 45 in the form of a hump projecting above the plane of the seal and the enclosed strap ends. In conjunction with this form of deformation, which provides abutting shoulders adapted to prevent relative endwise movement of the connected parts, there are employed a plurality of deformations 46 of the type disclosed in the Fork patent which are formed, as above explained, by bending downwardly cone-shaped marginal portions of the metal of the seal and the enclosed strap ends to form interlocking parts adjacent the ends of the joint. The deformations 46 are located opposite end other in pairs and their physical magnitude should preferably be the same as that of the deformations 45 in the middle of the joint or a greater magnitude.

Another form of the invention is shown in Figs. 11, 12 and 13, where deformations of the Norton type, located in the middle portion of the joint, are combined with deformations of the form disclosed in the above mentioned patent to Davis. In this embodiment, the strap 47 has overlapping strap ends 47a and 47b which are enclosed within a sleeve-like metal seal 48 which, prior to being deformed, has the characteristics of the seals above described, including a top wall 48a overlying the upper end 47a of the strap and the flanges 48b which underlie the lower end 47b of the strap. The metal of the strap and the seal is sheared transversely in the middle portion of the joint to form two pairs of oppositely disposed cuts 49 and intervening lugs 50 which are deflected downwardly to form interlocking shoulders. Adjacent the ends of the joint, the metal of the strap and seal is pressed inwardly, while holding intervening portions of the seal and the enclosed strap ends against buckling out of their original planes, thus forming deformations or crimps 51 which are arcuate in form and which involve the bending inwardly of portions of the seal and the upsetting of the metal of the edge portions of the strap ends, as shown at 52. These deformations 51 which absorb a part of the tensile stress put upon the joint are preferably of substantially the same magnitude as the deformations formed by the cuts 49 or they may be of greater magnitude, as previously described. The combinations of deformations of different character illustrated in Figs. 11, 12 and 13 may be embodied in joints having various numbers of deformations of each kind. In Fig. 14, there is shown a modification of the invention in which the strap 53 has ends overlapping within a sleeve-like metal seal 54. The seal and the enclosed strap ends are sheared at their lateral edges to form marginal cuts 55 and intervening lugs 56 which are deflected, as previously described, to provide interlocking shoulders. The end portions of the seal and the enclosed strap ends are crimped to provide deformations 57 of the Davis type having, preferably, a physical magnitude at least equal to the physical magnitude of the deformations formed by the cuts 55.

In Figs. 15, 16 and 17, there is disclosed another form of the invention in which the interlocking deformations formed by cutting the metal and bending adjacent parts thereof are of the type disclosed in the above mentioned patent to Prindle No. 2,053,739 and these are combined with other deformations of the type disclosed in said Flora patent. In this construction, the metal strap 60 has overlapping ends 60a and 60b which are enclosed within a sleeve-like metal seal 61. This seal and the enclosed strap ends are provided in the middle portion thereof with pairs of cuts 62 which extend through the upper wall 61a of the seal, as shown in Figs. 15 and 17, with the metal between the cuts deflected downwardly to such an extent as to sever the metal of the wall 61a of the seal in a direction at right angles to the cuts 62 while at the same time deflecting the metal of the strap ends 60a and 60b and of the lower flanges 61b of the seal downwardly to provide interlocking humps, as shown particularly at 63 in Fig. 17. The cuts 62 are arranged in pairs and the cuts of each pair are disposed opposite to another pair of cuts both transversely and longitudinally of the seal, as shown in Fig. 15. These deformations formed by the cuts 62 and the interlocking parts 63 are combined with deformations 64 of the type disclosed in said patent to Flora which have previously been described in connection with the form of construction shown in Figs. 1 to 4, inclusive. The depth or physical magnitude of the deformations 64 should properly be of the physical magnitude of the deformations formed by the cuts 62 and the deflected portions 63.

In Figs. 18 and 19, there is disclosed another modification of the invention in which interlocking deformations of the type disclosed in the patent to Prindle No. 1,981,371 are combined with the form of deformations disclosed in said patent to Davis. In this construction, the metal strap 65 has overlapping ends 65a and 65b which are enclosed within a sleeve-like metal seal 66. The lateral edges of the strap and seal are sheared transversely adjacent the middle of the seal to form parallel cuts 67 and a portion of the metal of the seal between each cut 67 and the adjacent end of the seal is deflected downwardly to form a downwardly projecting lug 68. Interlocking shoulders are thus provided along the plane of each cut 67, as shown in Fig. 19, but the opposite edge portions of each lug 68 are united with the body portions of the metal of the seal and the enclosed strap ends by inclined portions 69 and, in this respect, this type of interlocking joint differs from that disclosed in said Norton patent. Toward the ends of the seal, the opposite edges of the strap and the seal are pressed inwardly, as described in said Davis patent, to form deformations or crimps 70 having a physical magnitude which may preferably be at least equal to the physical magnitude or depth of the deformations 68.

Another form of the invention is shown in Figs. 20, 21 and 22, where deformations of the type described in my prior Patent No. 1,891,239 are combined with deformations of the type disclosed in said Fork patent. In this modification, the strap 72 has overlapping ends 72a and 72b which are enclosed within a sleeve-like metal seal 73 having a top wall 73a and bottom flanges 73b. At opposite sides of the middle portion of the seal, the metal of the seal and the enclosed strap ends is sheared along two pairs of parallel lines 74 and 75, the cuts 74 being longer than the cuts 75, and the intervening metal between the cuts of each pair being deflected downwardly to form a projecting lug 76. The lugs 76 are located opposite each other in pairs and the longer cuts 74 at the sides of these lugs are located adjacent the middle portion of the seal so that each lug is united with the body of the metal of the strap and seal along inclined lines 77, which lines at the margins of opposite lugs diverge away from each other toward one end of the seal. Interlocking shoulders are thus provided at the margins of each lug 76 for preventing relative endwise movement of the connected parts. These deformations which are formed by shearing the metal and deflecting adjacent portions thereof are combined with other deformations 78 of the type disclosed in said Fork patent which have a physical magnitude at least equal to the physical magnitude of the deformations formed by the cuts 74 and 75 and the intervening deflected portions of metal.

In Fig. 23 there is shown another form of the invention adapted for use on heavy strap or where heavy stresses are to be transmitted, in which three different types of deformations are combined in one joint. In this form, a strap 80 has overlapping ends which are enclosed within a sleeve-like metal seal 81. The marginal portions of the seal and the enclosed strap ends are sheared transversely at the middle portion of the joint to form cuts 82 which are located opposite each other in pairs with the intervening metal deflected downwardly to form lugs 83 and to provide interlocking shoulders at the edges of these lugs. On opposite sides of the lugs 83 there are provided other pairs of cuts 84 and 85, as in said patent to Ott, these cuts being of unequal depth with the longer cuts nearer the middle of the joint and with the intervening metal deflected downwardly to form lugs 86 and to provide interlocking shoulders at the edges of these lugs. Adjacent the end portions of the joint, the metal of the seal and the enclosed strap ends is crimped downwardly to provide deformations 87 of the type disclosed in said patent to Fork. All of these deformations may preferably be of substantially the same depth or physical magnitude.

In Fig. 24 there is disclosed another form of joint which is also adapted for heavy duty work, such as that of uniting the overlapping ends of heavy straps which are employed in binding together boxes, packages, barrels, or other load elements which may be secured together in the practice of the method of loading which is described and claimed in the United States patent to Chester M. MacChesney and John Ekern Ott, No. 1,703,495, dated February 26, 1929. In this construction, the metal strap 90 has overlapping ends which are enclosed within a sleeve-like metal seal 91. At the middle of the joint, the metal of the seal and the enclosed strap ends is sheared transversely to provide parallel cuts 92 at opposite sides of a deflected lug 93, thus providing interlocking shoulders, as in said Norton patent. Between the region of the lugs 93 and the ends of the seal there are provided two pairs of deformations 94 of the type disclosed in said patent to Prindle No. 2,053,739, these deformations 94 being arranged opposite each other in pairs both transversely and longitudinally of the joint. Adjacent the ends of the seal, there are provided other deformations 95 which do not involve the cutting of the metal and which are of the form disclosed in said patent to Fork. All of these deformations may preferably be of substantially the same depth or physical magnitude.

It will be observed that in all of the foregoing examples of the invention, the joint comprises deformations of different kind or character at different points longitudinally of the seal. The particular forms of deformations illustrated may be combined in other ways and other deformations having the required characteristics may be employed. By employing toward the ends of the joint deformations which do not require the cutting of the strap, it is possible to relieve the strain upon the shoulders of the interlocking joint at the middle portion of the seal and upon the uncut portion of the strap at said middle portion without weakening the strap materially in the end portions of the joint, and thus it is possible to obtain in the joint a closer approximation of the strength of the strap than it is possible to obtain by employing along each edge of the seal a series of deformations, each of which involves the cutting of the seal and the strap.

Although several forms of the invention have been shown and described by way of illustration, it will be understood that it may be constructed in various other embodiments coming within the scope of the appended claims.

I claim:

1. A strap joint comprising overlapping strap ends and an enclosing sleeve-like seal, the opposite edges of the strap and seal at the middle portion of the joint having a sheared bent portion forming interlocking shoulders extending transversely of the seal, the opposite edges of the strap and seal toward the ends of the joint having a crimped portion to form interlocking deformations.

2. A strap joint comprising overlapping strap ends and an enclosing sleeve-like seal, the middle portion of the joint having a sheared bent portion forming interlocking shoulders extending transversely of the seal, the ends of the joint having a crimped portion to form interlocking deformations.

3. A strap joint comprising overlapping strap ends and an enclosing sleeve-like seal, said seal and enclosed strap ends having a transversely sheared and bent portion between their lateral edges terminating short of said edges to provide interlocking shoulders, other parts of the seal and enclosed strap ends having crimped portions providing interlocking deformations.

JOHN EKERN OTT.